June 17, 1924.

L. R. SNYDER

VALVE

Filed April 27, 1923

1,497,803

Inventor
L. R. Snyder
By
Attorney

Patented June 17, 1924.

1,497,803

UNITED STATES PATENT OFFICE.

LEE ROY SNYDER, OF SACRAMENTO, CALIFORNIA.

VALVE.

Application filed April 27, 1923. Serial No. 635,047.

*To all whom it may concern:*

Be it known that I, LEE ROY SNYDER, a citizen of the United States of America, residing at Sacramento, in the county of Sacramento and State of California, have invented certain new and useful Improvements in Valves, of which the following is a specification.

This invention relates to an improvement in plate valves for compressors or the like with a particular view to cushion the opening action of the valve ring plates and to so form the cooperating portion of the valve proper as to prevent to a material extent metallic contact of said valve ring plate and valve body in the operation of the valve.

Valves of this type generally involve valve bodies formed with concentrically arranged openings normally closed by valves in the form of flat annular members or rings. These valves open under fluid pressure against the action of springs carried in the valve body, immediately closing through the action of said springs on relief of pressure. Ordinarily compressors acting at more than two hundred R. P. M. necessarily compel a correspondingly rapid action of these valve ring plates, and if the valve body is constructed, as has been heretofore proposed, to permit the contact of the ring valve with any portion of the body during this opening movement, such ring plates are deformed or in any event crystallize and break.

It is the object of the present invention to overcome these defects by forming a valve ring plate receiving channel in the valve body into which said ring plate moves in the opening movement of the valve. This channel is constructed to fully and completely receive the ring valve plate without permitting contact of said ring valve plate with the valve body proper, thereby avoiding the impact referred to. The channel is further formed with a view to providing a channel beneath the ring valve plate into which the fluid passing the valve, ordinarily a gas, may find its way as the valve is opened, the gas being trapped in the channel by the opening of the valve and forming a cushion for the ring valve plate in such opening movement. Thus, the ring valve plate is protected against impact and is cushioned in such opening movement by the gas accumulating in the channel, with the result that tendency to breakage of the valve from impact is avoided, and furthermore the gas cushion acts in an appreciable degree to render the closing action of the valve more rapid and uniform, the compressing of the gas cushion by the opening of the valve reversely assisting the closing of the valve when the pressure is relieved.

The invention also comprehends the interruption of the edge flange of the valve bonnet to provide for the more ready escape of the gas past the valves, thereby avoiding choking and the corresponding retarding of the valve movement.

The invention is illustrated in the accompanying drawings, in which.

Figure 1:
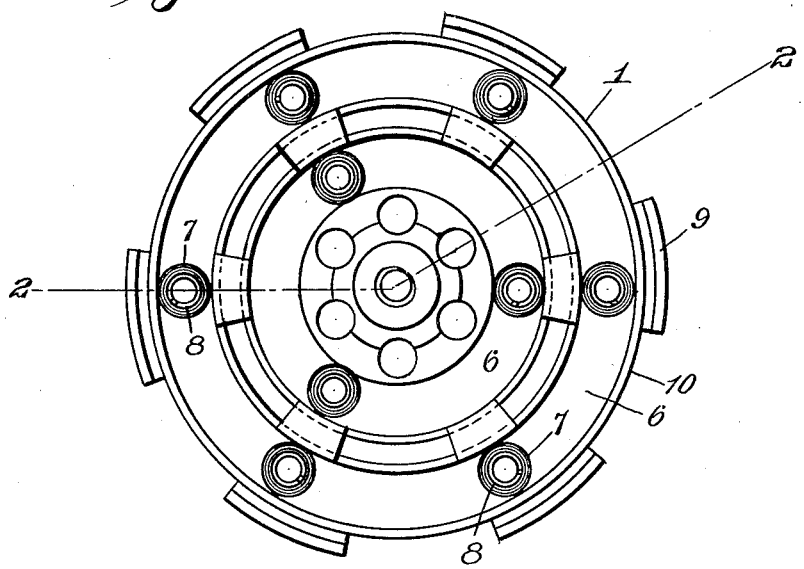
Fig. 1 is a plan view of the lower half or bonnet of the valve, the ring valve plates being removed.

The improved valve as illustrated includes a bonnet or lower portion 1, and a cap or upper portion 2, as is usual in valves of this type. The cap is formed with concentrically arranged inlets 3 terminating in annular flanges 4 forming valve seats. As illustrated, the valve is provided with two such sets of seats, though it is obvious that one or any desired number may be used. The inlets 3 are closed by annular flat ring-like valve members 5, adapted to cooperate with the seats 4 to cut off the flow of gas in the absence of pressure. Under pressure these ring valve plates open by moving from the seats 4 to permit the passage of gas. The parts just described are substantially conventional for this type of valve.

Figure 2:
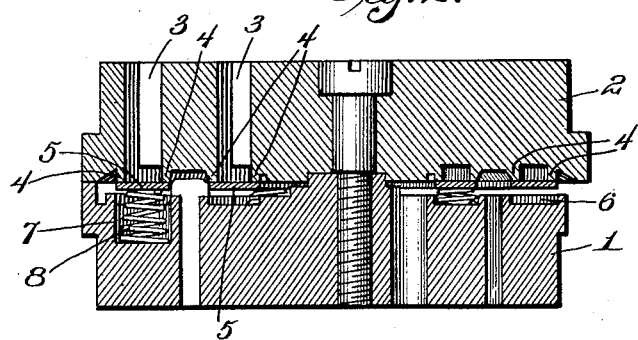
Fig. 2 is a vertical section of the valve parts on the line 2—2 of Fig. 1.

The lower half or bonnet is formed in alignment with the inlets 3 with annular channels 6, these channels directly underlying the ring valve plates, as shown particularly in Fig. 2. Within the channels are formed, at determinate points, depressions 7 to receive coil springs 8, which directly engage the ring valve plates and act to normally hold these valve plates in seated or closed relation in the absence of pressure.

Heretofore the channels 6 have been of less width than the similar dimension of the ring valve plates, so that in the opening movement of the valve plates, the edge walls of the channels were engaged by said valve plates, with a distinct impact, which as stated is determinal to the continued life and function of the valve plate.

In the present invention these channels 6 have a width exceeding that of the cooperating valve ring plate, so that the valve ring plate under opening pressure is permitted to move down into the channel without possible contact with the edge wall thereof. These channels serve an additional and an important function by being of sufficient depth to permit the gaseous fluid, immediately following the opening of the valve, to flow around the edges of the valve and fill such channels. As the valve or valves continue their opening movement, they trap the gas previously entering these channels with the result that the valves are cushioned in position opening movement and the pressure of the gas in the channels resulting from this cushioning tends to augment the closing action of the springs 8 on the valves, thus rendering the valves more rapid in their closing action.

Furthermore, the usual edge flange 9 about the bonnet and over which the gas escapes has been heretofore formed as an uninterrupted member, and thus to some extent has acted to retard the escape of the gas. In the present invention, this channel is cutaway at determinate intervals, providing free openings 10, through which the gas or air may escape to avoid choking the action of the valve.

Claims:

1. A valve having annular valve plates adapted to open under pressure, said valve being formed with channels into which the valves open, the said channels forming gas chambers to receive a gas charge in the initial opening of the valve for cushioning the valve movement.

2. A valve having annular valve plates adapted to open under pressure, said valve being formed with channels into which the valves open, the said channels forming gas chambers to receive a gas charge in the initial opening of the valve for cushioning the valve movement, and springs arranged in said channels to normally maintain the valves in closed position.

3. A plate valve having annular channels to receive ring valves in the opening of the latter, said channels having a width exceeding that of the ring valves and a depth greater than the opening movement of the valves, whereby to avoid valve plate impact in such opening valve movement.

In testimony whereof I affix my signature.

LEE ROY SNYDER. [L. S.]